United States Patent
Bowman et al.

(10) Patent No.: US 9,117,191 B2
(45) Date of Patent: Aug. 25, 2015

(54) AUTOMATIC DEVICE INVENTORY MANAGEMENT FOR DIFFERENT TYPES OF DEVICES

(75) Inventors: Bruce Bowman, San Jose, CA (US); Charles C. Scheinost, Forest Knolls, CA (US); Mike Harris, Santa Rosa, CA (US); Amit Kishnani, Foster City, CA (US); Matthew Hamlin, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 97 days.

(21) Appl. No.: 13/536,921

(22) Filed: Jun. 28, 2012

(65) Prior Publication Data

US 2014/0006225 A1    Jan. 2, 2014

(51) Int. Cl.
  *G06Q 10/00* (2012.01)
  *G06F 15/16* (2006.01)
  *G06Q 10/08* (2012.01)

(52) U.S. Cl.
  CPC .................. *G06Q 10/087* (2013.01)

(58) Field of Classification Search
  None
  See application file for complete search history.

(56) References Cited

U.S. PATENT DOCUMENTS

| | | | |
|---|---|---|---|
| 8,373,538 B1 * | 2/2013 | Hildner et al. | 340/3.1 |
| 8,392,545 B2 * | 3/2013 | Hallamaa et al. | 709/223 |
| 2005/0043973 A1 * | 2/2005 | Childers | 705/5 |
| 2005/0086328 A1 * | 4/2005 | Landram et al. | 709/220 |
| 2011/0213821 A1 * | 9/2011 | Gentile et al. | 709/202 |
| 2012/0036552 A1 * | 2/2012 | Dare et al. | 726/1 |
| 2012/0179802 A1 * | 7/2012 | Narasimhan et al. | 709/223 |
| 2013/0103816 A1 * | 4/2013 | Morley et al. | 709/223 |

FOREIGN PATENT DOCUMENTS

WO    WO 2009056148 A2 *    5/2009    .............. H04L 29/08

* cited by examiner

*Primary Examiner* — Ig T An
*Assistant Examiner* — Michael Maicher
(74) *Attorney, Agent, or Firm* — Shook, Hardy & Bacon L.L.P.

(57) ABSTRACT

An apparatus and method for automatically inventorying a plurality of devices is disclosed herein. A secure, trusted connection is established between a remote device each device of a plurality of devices. The remote device automatically extracts device information from each device of the plurality of devices. The remote device creates an inventory of the plurality of devices based on the extracted device information. The remote device automatically maintains the inventory including automatically extracting at least updated device information associated with an update event of the first device.

20 Claims, 7 Drawing Sheets

AUTOMATIC DEVICE INVENTORY MANAGEMENT FOR DIFFERENT TYPES OF DEVICES

FIELD

The present disclosure relates generally to managing device information. More particularly, the present disclosure relates to device inventory management.

BACKGROUND

An organization or certain workgroups within an organization may have use of a plurality of devices comprising a variety of device types. For instance, a mobile web development group, a mobile app development group, or a mobile content development group may use a large number of devices to design and test content to be accessed on such device types. As another example, an organization may provide a variety of devices to its employees depending upon their job requirements. Because these devices comprise the organization's assets, each acquired device is inventoried before being provided to a user.

Even after a device has been added to the inventory, information about the device should be updated in accordance with changes to the device. With mobile devices, for example, effective inventory management includes keeping track of locations of mobile devices and who has the mobile devices. However, with device inventory typically being done via manual data entry, it is a significant chore to manage inventory of devices. If the inventory of devices is not effectively managed, the organization may rapidly lose control of its devices or even scheduling a software upgrade may be problematic.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the terms used.

DETAILED DESCRIPTION

The following description is presented to enable any person skilled in the art to create and use a computer system configuration and related method and article of manufacture to obtain and maintain an inventory of a plurality of devices associated with an organization or workgroup. A control unit having access to a plurality of devices over a secure, trusted network takes advantage of the secure, trusted connection to automatically extract device information from each of the devices of the plurality of devices. The extracted device information about the devices is stored in a database for inventory management purposes. At least a portion of the extracted device information can be used to automatically obtain supplemental device information about the plurality of devices from a source other than the plurality of devices. The supplemental device information can also be stored in the database for inventory management purposes. As device information changes (e.g., a user uses a device), the inventory information stored in the database is automatically updated accordingly. The inventory can then be mined for useful statistics, to schedule use of devices, alert users regarding certain device events or actions to take on devices, and/or to add freeform-type of device information not available from polling the devices or another source to the database.

Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
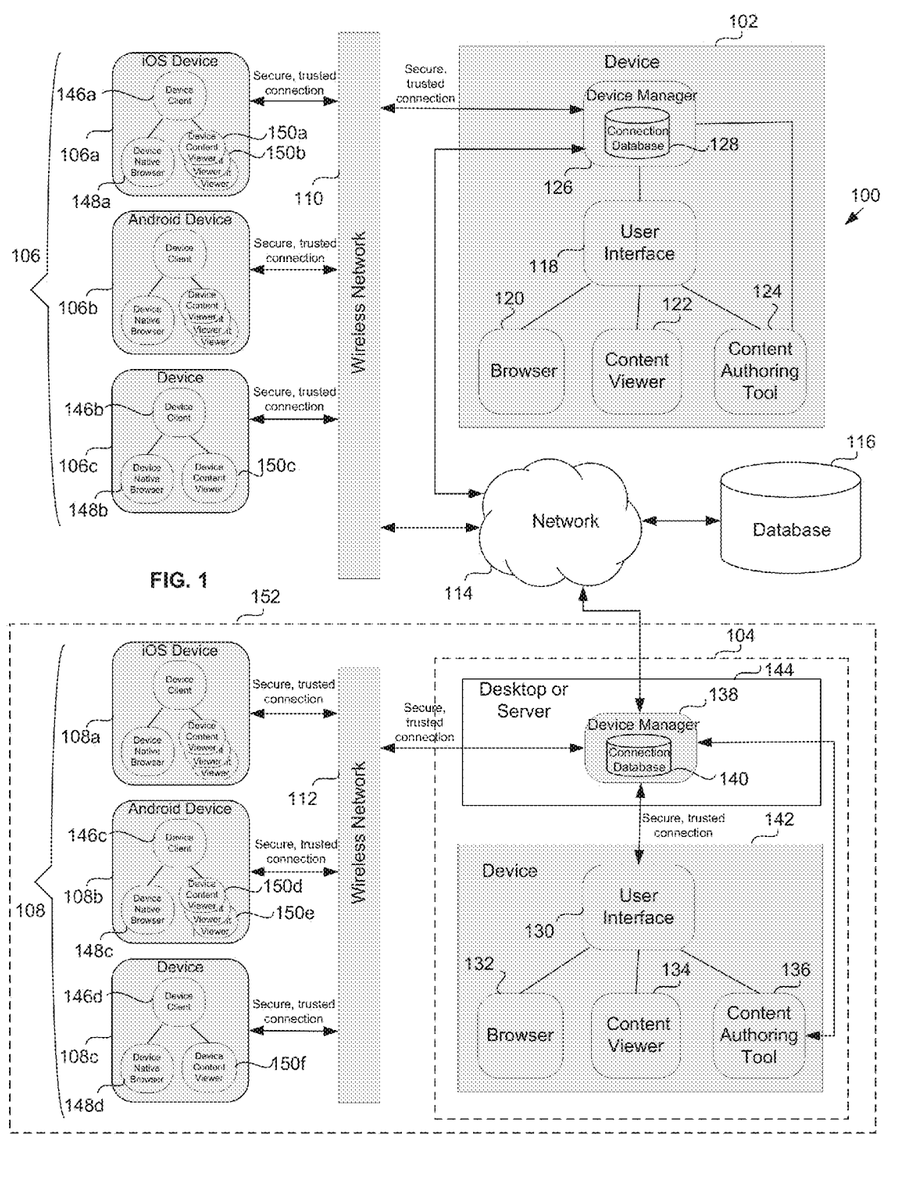
FIG. 1 illustrates an example system for managing inventory of a plurality of devices according to one embodiment.

FIG. 1 illustrates an example system 100 for managing inventory of a plurality of devices according to one embodiment. System 100 includes a first control unit 102, a second control unit 104, a plurality of devices 106a, 106b, 106c (collectively referred to as devices 106 and any one of the devices 106a, b, c as a device 106), a plurality of devices 108a, 108b, 108c (collectively referred to as device 108 and any one of the devices 108a, b, c as a device 108), a first network 110, a second network 112, a network 114, and a database 116. Each of the first control unit 102, second control unit 104, first network 110, and database 116 is in communication with the network 114.

The first control unit 102 comprises a computing device—such as, but not limited to, a computer (e.g., laptop, desktop, workstation), server, or mobile communication device including one or more processors configured to communicate with devices 106 via first network 110. The first control unit 102 is also configured to communicate with each of the second control unit 104 and the database 116 via network 114. The first control unit 102 includes one or more applications, developed content, and information about devices 106. In one embodiment, the first control unit 102 includes a user interface 118, a browser 120 (e.g., web browser application such as INTERNET EXPLORER, FIREFOX, SAFARI, etc.), a content viewer 122, a content authoring tool 124, a device manager 126, and a (connection) database 128. The user interface 118 is configured for communication with each of the browser 120, content viewer 122, content authoring tool 124, and device manager 126. The content authoring tool 124 communicates with the device manager 126. The database 128 is shown in FIG. 1 as being part of the device manager 126. Alternatively, the database 128 may be provided outside of the device manager 126 while still configured for communication with the device manager 126. The first control unit 102 may be referred to as a device, computing device, a first device, a control unit, or a server.

The second control unit 104 is similar to the first control unit 102 except that it comprises two machines instead of one. The second control unit 104 includes a user interface 130, a browser 132, a content viewer 134, a content authoring tool 136, a device manager 138, and a (connection) database 140, which are similar, respectively, to the user interface 118, browser 120, content viewer 122, content authoring tool 124, device manager 126, and database 128 of the first control unit 102. The user interface 130, browser 132, content viewer 134, and content authoring tool 136 are provided in a computing device 142, while the device manager 138 and database 140 are provided in a separate computer (e.g., laptop, desktop, workstation) or server 144. Computing device 142 and computer/server 144 communicate with each other over a secure, trusted connection (which may be either a wired or wireless network). The implementation of each of the first and second control units 102,104 using one, two, or more machines is merely one of design choice. However many machines are used in the implementation, similar functionalities are provided by each of the first and second control units 102, 104. The second control unit 104 may be referred to as a device, computing device, a first device, a control unit, or a server.

The first and second control units 102, 104 can be geographically co-located or distributed from each other. For example, the first control unit 102 may be located in the United States and the second control unit 104 may be located in China. The first and second control units 102, 104 communicate with each other via the network 114, and each may access information stored in the database 116.

Each of the devices 106 comprises a computer or other computing device, including but not limited to, work stations, personal computers, general purpose computers, Internet appliances, Internet-enabled televisions, Internet-enabled entertainment systems, hand-held devices, wireless devices, portable devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. The devices 106 comprise a variety of different types of devices different from each other in hardware, firmware, software, operating system, operating system version, platform, web browser, content viewing applications, and/or the like. As shown in FIG. 1, for example, device 106a can be a device running a particular version of the iOS operating system, device 106b can be a device running a particular version of the Android operating system, while device 106c can be an Internet-enabled television. Although three devices 106 are shown in FIG. 1, it is understood that more or less than three devices may be included in the system 100. As an example, hundreds or thousands of different types of devices may be represented by the devices 106.

Each of the devices 106 communicates with the first control unit 102 via the first network 110. Devices 106 may be geographically distributed or co-located with each other. One or more of devices 106 may be geographically co-located or dispersed from the first control unit 102. Device 106a includes a device client 146a (also referred to as a device application or device app), a device native browser 148a (e.g., web browser application such as INTERNET EXPLORER, FIREFOX, SAFARI, etc.), and one or more device content viewers 150a, 150b (e.g., Adobe Acrobat, Adobe FlashPlayer, Adobe Ideas). Device 106b includes a device client, a device native browser (e.g., web browser application such as INTERNET EXPLORER, FIREFOX, SAFARI, etc.), and one or more device content viewers (e.g., Adobe Acrobat, Adobe FlashPlayer, Adobe Ideas). Device 106c includes a device client 146b, a device native browser 148b (e.g., web browser application such as INTERNET EXPLORER, FIREFOX, SAFARI, etc.), and one or more device content viewers 150c (e.g., Adobe Acrobat, Adobe FlashPlayer, Adobe Ideas). Device clients 146a, b, etc. included in the devices 106a, b, c are collectively referred to as device clients 146, and any one of the device clients 146a, b, etc. is referred to as a device client 146. Device native browsers 148a, b, etc. included in the devices 106a, b, c are collectively referred to as device native browsers 148, and any one of the device native browsers 148a, b, etc. is referred to as a device native browser 148. Device content viewers 150a, b, c included in the devices 106a, b, c are collectively referred to as device content viewers 150, and any one of the device content viewers 150a, b, c is referred to as a device content viewer 150. A device client 146 is installed on each of the devices 106 to facilitate communication with the first control unit 102. The device native browser 148 may differ from one type of device to another. For example, Safari may be the native browser for an iOS device (e.g., device 106a) while Chrome may be the native browser for an Android device (e.g., device 106b). Similarly, the content viewer 150 may differ from one type of device to another.

The devices 108 are similar to the devices 106 except that devices 108 are configured to communicate with the second control unit 104 over the second network 112.

Each of the first and second control units 102, 104 can be computing devices similar to devices 106, 108. The first control unit 102 differs from devices 106, 108 by inclusion of the device manager 126 and connection database 128 instead of the device clients 146a, b, c, d in devices 106, 108. The second control unit 104 differs from devices 106, 108 by inclusion of the device manager 138 and connection database 140 instead of the device clients 146a, b, c, d in devices 106, 108. Accordingly, as an example, the first control unit 102 and the devices 106 together comprise a plurality of devices, with the first control unit 102 being a device from among the plurality of devices that establishes communication with the rest of the plurality of devices to effect content synchronization among the plurality of devices. As another example, the second control unit 104 and the devices 108 can comprise a plurality of devices for content synchronization. As still another example, the first control unit 102 and the devices 108 can comprise a plurality of devices for content synchronization.

Each of the first network 110 and second network 112 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a WiFi network, a WiMax network, a portion of the Internet, the Internet, a portion of a public switched telephone network (PSTN), cellular network, or a combination of two or more such networks. When first or second network 110, 112 comprises a public network, security features (e.g., VPN/SSL secure transport) may be included to ensure authorized access on the network. Each of the first and second networks 110, 112 comprises a wired or wireless network. The devices 106 and/or 108 communicate with the appropriate control unit using, for example, Transmission Control Protocol/Internet Protocol (TCP/IP).

In one embodiment, the first and second networks 110, 112 comprise different types of networks that are incompatible with each other. For example, the first network 110 may be a Global System for Mobile Communications (GSM) cellular network and the second network 112 may be a Code Division Multiple Access (CDMA) cellular network. In this case, the devices 106 (which are GSM chip devices) cannot communicate over the second network 112. Conversely, the devices 108 (which are CDMA chip devices) cannot communicate over the first network 110. In another embodiment, the first and second networks 110, 112 may comprise geographically distant networks from each other, such that the devices 106 on the first network 110 are out of range of communication with the second network 112, and the devices 108 on the second network 112 are out of range of communication with the first network 110.

Hence, in some embodiments, the first control unit 102 and the devices 106 comprise a wireless peer-to-peer network with the first network 110. Similarly, the second control unit 104 and the devices 108 comprise a wireless peer-to-peer network with the second network 112.

The network 114 comprises a communications network, such as a local area network (LAN), a wireless LAN (WLAN), a wide area network (WAN), a wireless WAN (WWAN), a metropolitan area network (MAN), an ad hoc network, intranet, an extranet, virtual private network (VPN), a portion of the Internet, the Internet, a portion of a public switched telephone network (PSTN), cellular network, or a combination of two or more such networks. When network 114 comprises a public network, security features e.g., VPN/SSL secure transport) may be included to ensure authorized access within system 100.

Database 116 comprises one or more databases configured to communicate with the first control unit 102 and/or the second control unit 104. Database 116 may be located at one or more geographically distributed locations from each other and also from first or second control units 102, 104. Alternatively, database 116 may be included within the first or second control unit 102, 104. Database 116 comprises a storage device for storing data for use by the first or second control unit 102, 104. For example, the database 116 may store information about devices (e.g., device model number, its operating system version, firmware version, carrier information, IP address, connection history, device parameter settings, etc.), secure connection information (e.g., security tokens), developed content, and the like.

In one embodiment, the device manager 126 of the first control unit 102 is configured to provide content and/or commands to the devices 106 over the first network 110. The device manager 126 is responding to instructions issued by the user on the user interface 118. In another embodiment, the user interacts with the user interface 130 and device manager 138 of the second control unit 104 to cause the device manager 126 of the first control unit 102 (via network 114) to communicate with the devices 106 over the first network 110. The database 116 can serve as a linking mechanism by providing device and secure connection information unknown by the second control unit 104 to the first control unit 102. Such indirect control over the devices 106 may arise when, for example, a subsystem 152 (including the second control unit 104, devices 108, and second network 112) is geographically distal to the devices 106 and/or because the second control unit 104 is on a different network from the first network 110 and is unable to directly communicate with the devices 106. For example, a developer in China may wish to test content developed in China on devices located in the United States. The first and second control units 102, 104 enjoy a trusted server-to-server type of relationship, which provides a synchronization environment across separate, disparate networks.

Accordingly, although not shown in FIG. 1, a control unit can be included in the system 100 that does not have direct communication capabilities with devices. For example, devices 106 and first network 110 may be omitted, and a user can interact with the devices 108 from the first control unit 102 or the second control unit 104.

Figure 2:
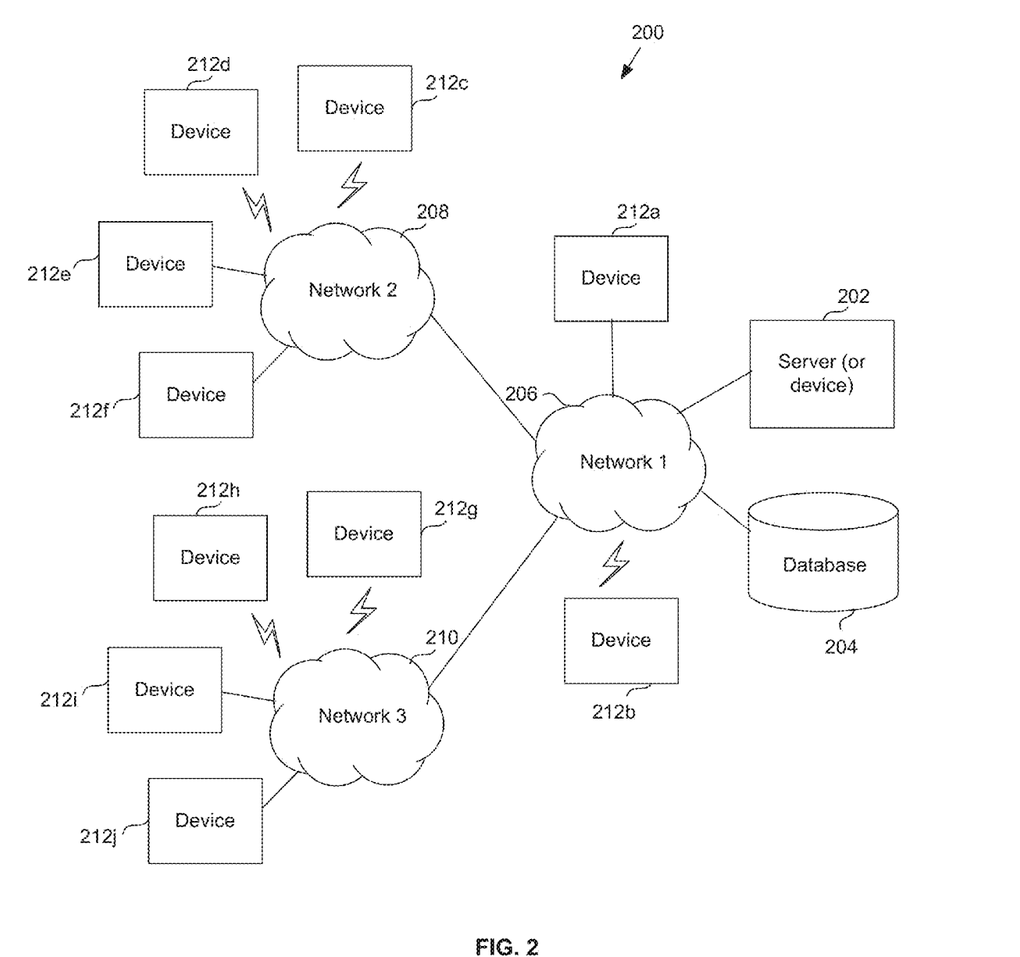
FIG. 2 illustrates an example system for managing inventory of a plurality of devices according to an alternative embodiment to the embodiment shown in FIG. 1.

FIG. 2 illustrates an example system 200 for managing inventory of a plurality of devices according to an alternative embodiment. While system 100 represents device inventory management implemented using anon-cloud based system, system 200 represents device inventory management implemented using a cloud-based system. System 200 includes a third control unit 202, a database 204, a first network 206, a second network 208, a third network 210, and a plurality of devices 212a-212j (devices 212a-212j are collectively referred to as devices 212 and individually as a device 212). Each of the third control unit 202, database 204, device 212a, and device 212b is in communication with the first network 206. Each of the devices 212c, 212d, 212e, and 212f is in communication with the second network 208. Each of the devices 212g, 212h, 212i, and 212j is in communication with the third network 210. The first network 206 is in communication with each of the second network 208 and third network 210.

The third control unit 202 comprises a computing device including one or more processors configured to perform inventory management of devices 212. The third control unit 202 (also referred to a computing device, first device, device, or server) is configured for communication with each of the database 204, device 212a, and device 2120 via the first network 206. The third control unit 202 is further configured for communication with devices 212c, 212d, 212e, and 212f via the first and second networks 206, 208, and with devices 212g, 212h, 212i, and 212j via the first and third networks 206, 210. The third control unit 202 includes one or more applications, security protocols, communication capabilities, and information about the devices 212 to facilitate inventory management described in detail below.

The database 204 comprises an information storage device configured to store information about the devices 212 (e.g., device model number, its operating system version, firmware version, carrier information, IP address, connection history, device parameter settings, etc.), secure connection information (e.g., security tokens), and other information associated with accessing the devices 212. The third control unit 202 accesses the information stored in the database 204 and provides information for storage to the database 204. Although the database 204 is shown accessed via the first network 206, it is understood that a direct communication line may exist between the third control unit 202 and database 204. Alternatively, the database 204 may comprise a part of the third control unit 202.

The third control unit 202 and database 204 can be geographically co-located or distributed from each other. Although a single third control unit 202 and a single database 204 are shown in FIG. 2, it is understood that one or more of third control unit 202 and/or one or more of the database 204 can be included in the system 200.

Each of the devices 212 comprises a computer or computing device, including but not limited to, work stations, personal computers, general purpose computers, Internet appliances, Internet-enabled televisions, Internet-enabled entertainment systems, hand-held devices, wireless devices, mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, ultrabooks, laptops, netbooks, and the like. The devices 212 comprise a variety of different types of devices different from each other in hardware, firmware, software, operating system, platform, service packs, web browser, content viewing applications, and/or the like. For example, device 212c can be a device finning a particular version of the iOS operating system, device 212d can be a device running a particular version of the Android operating system, while device 212e can be an Internet-enabled television. More or less than two of the devices 212 may communicate over the first network 206; more or less than four of the devices 212 may communicate over the second network 208; and more or less than four of the devices 212 may communicate over the third network 210. As an example, hundreds or thousands of different types of devices may be represented by the devices 212.

Each of devices 212a, 212b communicates with the third control unit 202 via the first network 206. Each of devices 212c, 212d, 212e, 212f communicates with the third control unit 202 via the first and second networks 206, 208. Each of devices 212g, 212h, 212i, 212j communicates with the third control unit 202 via the first and third networks 206, 210. Devices 212 may be geographically distributed or co-located with each other and/or from the third control unit 202.

Figure 3:
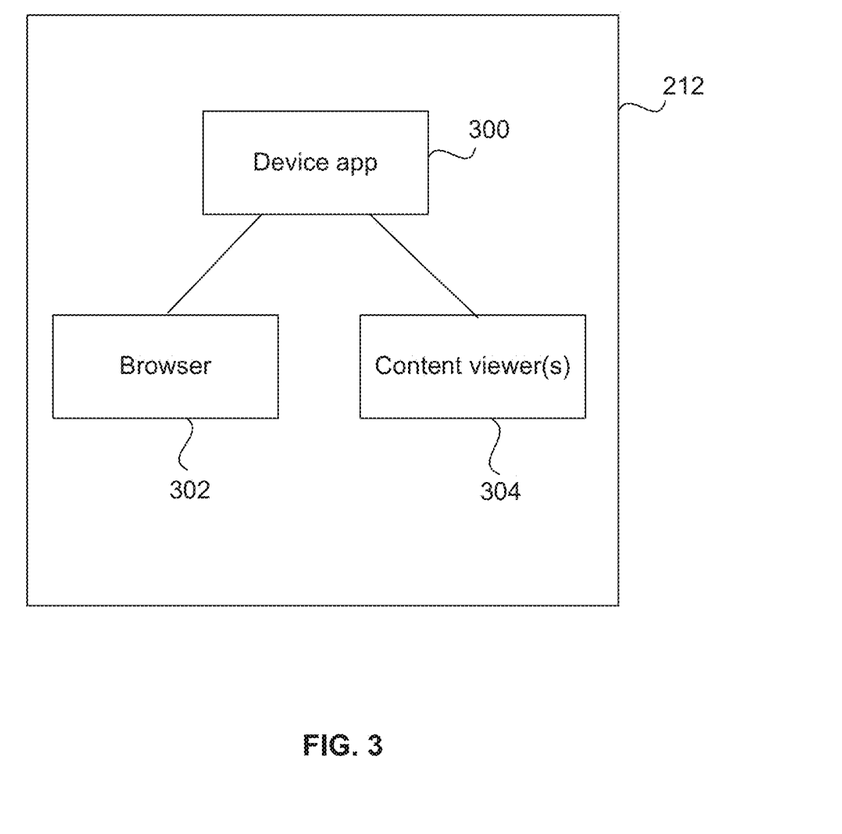
FIG. 3 illustrates block diagram details of any device of the plurality of devices shown in FIG. 2.

The first control unit 102, second control unit 104, and third control unit 202 are similar to each other. The first control unit 102, second control unit 104, and third control unit 202 may be referred to as inventory management devices. Although not shown, the third control unit 202 may include one or more components of either first control unit 102 or second control unit 104. The devices 106, devices 108, and devices 212 are similar to each other. As discussed above with respect to FIG. 1, each of the devices 212 may similarly include a device client, a device native browser, and one or more device content viewers. FIG. 3 shows each of the devices 212 including a device application or device app 300 (also referred to as a device client), a device native browser 302 (e.g., web browser application such as INTERNET EXPLORER, FIREFOX, SAFARI, CHROME, etc.), and one or more device content viewers 304 (e.g., Adobe Acrobat, Adobe FlashPlayer, Adobe Ideas). The device app 300 can be downloaded from an appropriate e-commerce site associated with the type of device 212 or from the third control unit 202. For example, for an Android-type of device, the device app 300 may be provided by an Android Market Place e-commerce site, whereas an iOS-type of device may obtain its device app 300 from iTunes. The browser 302 may differ from one type of device to another. For example, Safari may be the native browser for an iOS device while Chrome may be the native browser for an Android device. Similarly, the content viewer 304 may differ from one type of device to another.

In one embodiment, each of the devices 106, devices 108, and devices 212 comprises a mobile device in communication with its respective first control unit 102, second control unit 104, or third control unit 202 within a wireless communications network (e.g., WiMax, Bluetooth, cellular, etc.).

Figure 4:
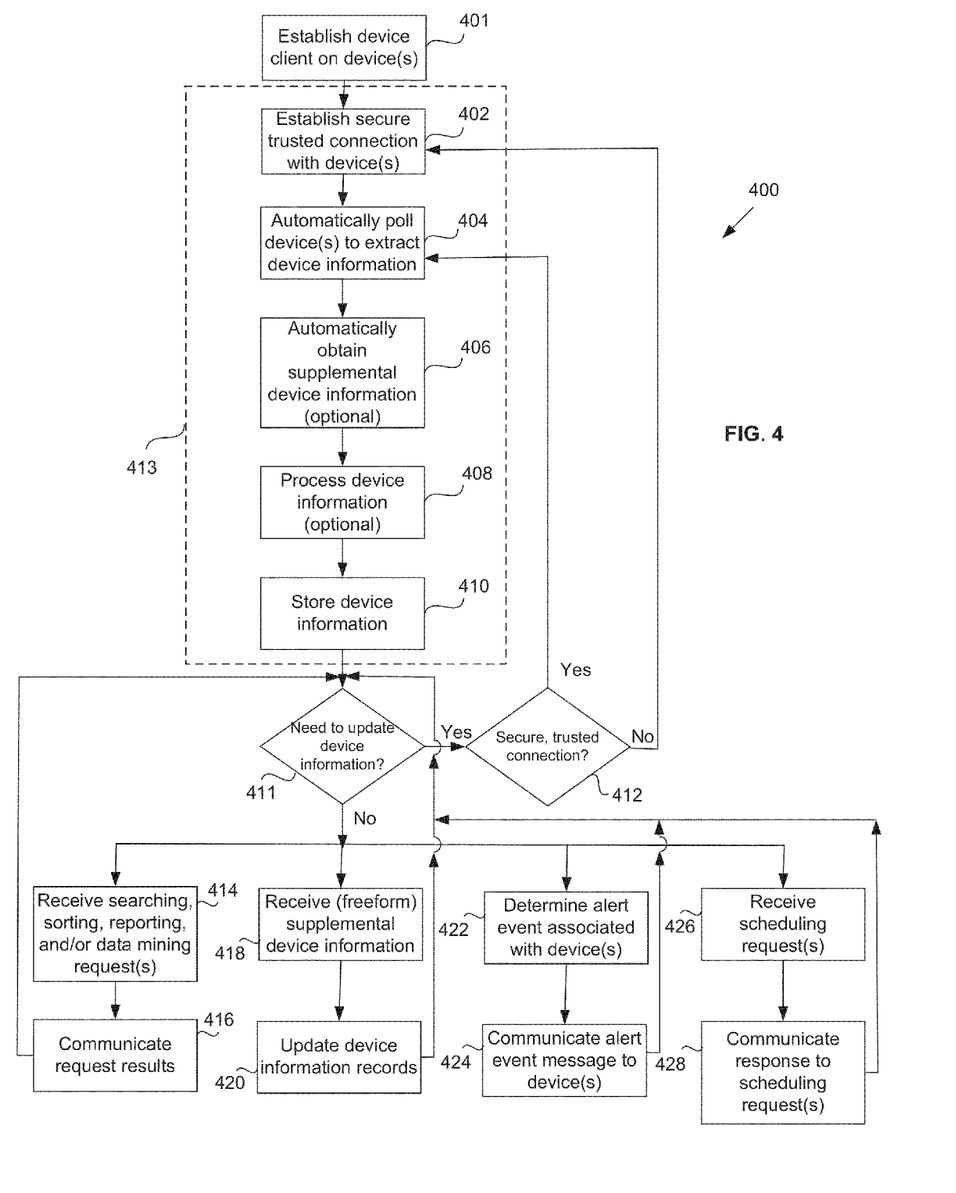
FIG. 4 illustrates an example flow diagram showing functionalities and operations associated with device inventory management implemented in the system of FIG. 1 and/or FIG. 2 according to some embodiments.
Figure 5:
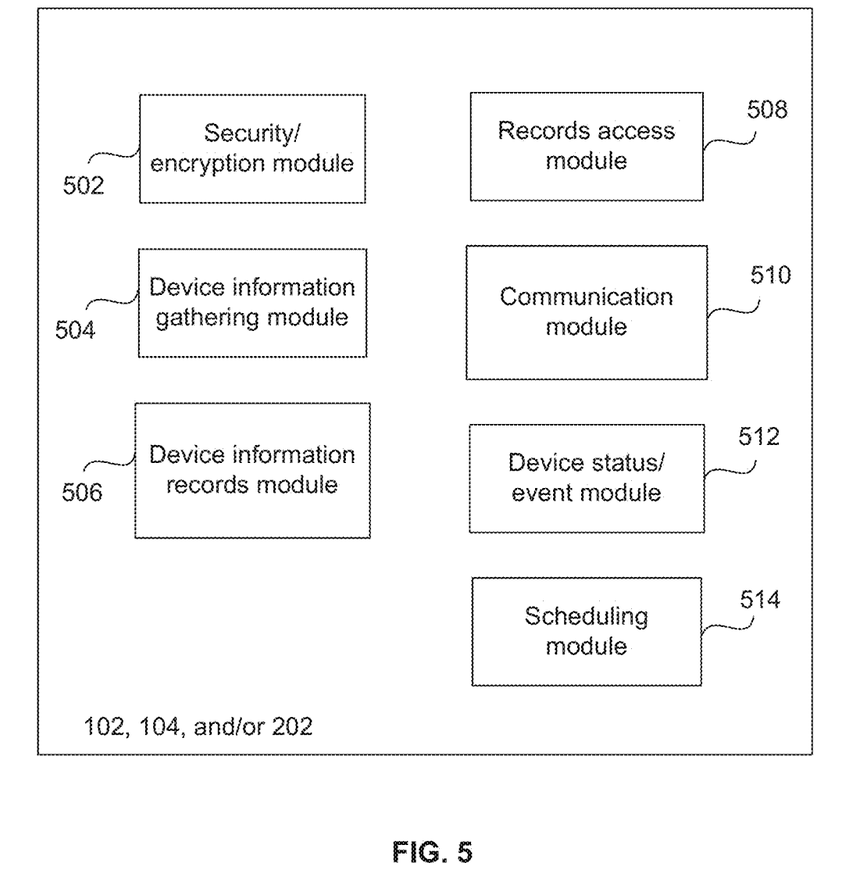
FIG. 5 illustrates example modules implementing the flow diagram of FIG. 4 according to some embodiments.

FIG. 4 illustrates an example flow diagram 400 showing functionalities and operations associated with device inventory management according to some embodiments. FIG. 5 illustrates example modules implementing the flow diagram 400 of FIG. 4 according to some embodiments. The modules of FIG. 5 comprise one or more software components, programs, applications, apps, or other units of code base or instructions configured to be executed by one or more processors included in the first control unit 102, second control unit 104, third control unit 202, devices 106, devices 108, and/or devices 212. The modules of FIG. 5 includes a security/encryption module 502, a device information gathering module 504, a device information records module 506, a records access module 508, a communication module 510, a device status/event module 512, and a scheduling module 514. Although modules 502-514 are shown as distinct modules in FIG. 5, it should be understood that modules 502-514 may be implemented as fewer or more modules than illustrated. It should also be understood that any of modules 502-514 may communicate with one or more components included in the system 100 (or system 200), such as the database 116 (or database 204) and/or other components not shown in system 100 (or system 200), such as third party web servers.

FIGS. 4 and 5 are described below in conjunction with each other and with respect to system 100. However, it is understood that FIGS. 4 and 5 can also be implemented in the system 200. For example, where the first or second control units 102, 104 of system 100 is mentioned, the third control unit 202 of system 200 can alternatively be used. As another example, where devices 106 or 108 of system 100 are mentioned, devices 212 of system 200 can alternatively be used. Each of the first control unit 102, second control unit 104, and third control unit 202 may be referred to as an inventory management device.

At a block 401, the device client 146 is established on or provided to each of the devices 106. The device client 146 includes at least a client inventory management component to facilitate the automatic inventory creation and maintenance by the first control unit 102. In one embodiment, the device client 146 can be accessed (and downloaded) from the first control unit 102 via the first network 110. In another embodiment, the device client 146 can comprise an app that is accessible (and downloadable) from an appropriate e-commerce site associated with the brand of the device 106. For example, for an Android-type of device, the device application 300 may be installed from an Android Market Place e-commerce site, whereas an iOS-type device may obtain its device client 106 from iTunes.

At a block 402, the security/encryption module 502 is configured to establish a secure, trusted connection between the first control unit 102 and one or more of the devices 106 over the first network 110. At least a portion of the security/encryption module 302 may be included in each of the device manager 126 and the device client 146. A trusted connection is secured between the first control unit 102 and a given device 106 by exchanging a set of security keys (also referred to as security code or tokens) indicating that a given pair of machines is allowed to communicate with each other. In a given pair of machines, the first control unit 102 and the device 106 independently obtains information about its environment, machine state, etc, to determine what a successful security key should be. This code or token is exchanged between the first control unit 102 and the device 106. A secure, trusted connection may persistent for an entire session. For the initial connection, a user may manually enter a network address, IP addresses, etc. to specify connection parameters.

A given device 106 registers, establishes an account, or otherwise goes through specific steps dictated by the first control unit 102 in order to establish itself as an authenticated device. This may include the first control unit 102 defining a unique device identifier, key, or authentication information unique to the given device 106 such that establishing a secure, trusted connection between the first control unit 102 and the given device 106 at block 402 comprises, in part, reaffirming the authentication of the device. In some embodiments, the given device 106 "registers" with the first control unit 102 for a purpose other than for inventory management, such as to serve as a test device that renders content specified by the first control unit 102 or to allow remote access by the first control unit 102. While a secure, trusted connection may then be used for the first control unit 102 to instruct content to be rendered or for remote access, the same or subsequent secure, trusted connection can also be used by the first control unit 102 for other purposes, such as to create and manage an inventory of devices as described herein.

The devices 106 may comprise the devices for an organization, for a workgroup within an organization, or other designated group for which automatic inventory functionalities are desired. Once a secure connection has been established between the first control unit 102 and devices 106, the device information gathering module 504 is configured to automatically poll one or more of the devices 106 to extract one or more device information at a block 404. The first control unit 102 may initiate the polling operation, and interact with the device client 146 at the respective devices 106. The device information obtained from the devices 106 may comprise metadata and other like types of data.

At a block 406, the device information gathering module 504 can also be configured to obtain (supplemental) device information from one or more sources other than the devices 106, such as web servers or device information repositories. Such sources may be accessed to obtain device information not available or readily available from the devices 106. In some instances the device information obtained at block 404 provides access to or identifies the device information to be obtained at block 406. Alternatively, block 406 may be optional if the desired device information is accessible from the devices 106.

The device information obtained at blocks 404 and/or 406 comprises, but is not limited to: device name, device Internet Protocol (IP) address, device model number, device serial number, device identifier (e.g., unique device identifier (UDID)), operating system (OS) version, software version, application version, firmware version, kernel version, build number, browser details (e.g., OS default browser, browser version, WebKit version, etc.), screen details (e.g., screen resolution, display resolution, screen type (e.g., backlit, sidelit, etc.)), hardware acceleration (e.g., graphical processing unit (GPU)) availability, sound mode (e.g., silent, vibrate, audible), battery status (e.g., discharging, charging), battery charge level (e.g., 60%), phone number, network type, carrier, service state, mobile network state (e.g., AT&T, high speed packet access (HSPA), in service, disconnected), signal strength, international mobile equipment identity (IMEI), IMEI software version, WiFi settings (e.g., Wi-Fi on or off, the service set identifier (SSID) it is connected to), Wi-Fi media access control address (MAC) address, Bluetooth address, up time, location (e.g., current global positioning satellite (GPS) coordinates, last known GPS coordinates), storage capacity, current storage availability, account information (e.g., email addresses, types of accounts, etc.), information associated with the existence or details of hardware features of the device (such as a camera and its associated resolution, accelerometer, GPS chip), and/or other information associated with a state, settings, configuration, hardware, firmware, software, implementation, identifiers, or accounts for each device 106 being inventoried.

At a block 408, the device information gathering module 504 and/or the device information records module 506 is configured to process at least some of the obtained device information, on an as needed basis, to ready the obtained device information for storage and later access. Depending on the format or state of the obtained device information, no processing may be required, in which case block 408 may be omitted.

Next at a block 410, the obtained device information for each of the devices 106 is saved as one or more files or records in one or more storage mediums, such as the database 116 or database 204 (by the device information records module 506). These files or records comprise a local, personal, workgroup, or organization specific device inventory. When an update event occurs for a given device 106 such that its device information changes after the initial inventory is taken (e.g., the device is used by a user, device update occurs, battery status changes, location changes, OS version changes, firmware version changes) (block 411 and yes branch), the inventory files/records associated with the given device 106 is automatically updated. If the first control unit 102 still has a secure, trusted connection with the given device 106 (block 412 and yes branch), then extraction of the (new) device information occurs at the block 404. If there is no longer a secure, trusted connection with the given device 106 (block 412 and no branch), then a secure, trusted connection may be reestablished at block 402 before extracting new or updated device information at the block 404. Blocks 401-410 (collectively referred to as the inventory creation and maintenance blocks 413) or blocks 404-410 are repeated periodically, on an ad hoc basis, or as device information changes, to maintain the device inventory current. Once the initial files/records are created for the devices 106, subsequent performance of blocks 404 and/or 406 can be less extensive compared to the first time since typically less than all of the device information is updated.

Once a master inventory of the devices in a trusted network with the first control unit 102 has been established (and appropriately maintained) (block 411 and no branch), the master inventory can be mined for useful statistics (e.g., percentage of devices that upgraded to a new OS, how long it takes for devices to upgrade to a new OS once the upgrade becomes available, models or types of devices mostly tested, etc.), to schedule use of devices, alert users regarding certain device events or actions to take on devices, and other functionalities are made possible by virtue of the master inventory.

For instance, at a block 414, the first control unit 102 receives searching, sorting, reporting, and/or data mining requests from organization or group personnel who have access to the device inventory. One or more files, records, or data fields of the device inventory are selectively accessed by the records access module 508 to fulfill the received searching, sorting, and/or data mining requests, such as identifying devices within the device inventory matching specific criteria. The communication module 510 communicates the request results, such as in an email, to the requester at a block 416.

At a block 418, the first control unit 102 receives freeform-type information from organization or group personnel for inclusion into the inventory files/records stored in the database(s). The received information comprises, but is not limited to, freeform notes, annotations, or in general additional device information (not obtained at blocks 404 or 406) associated with one or more of the given devices 106. For example, the received information includes the device purchase date, device purchase price, service contract provider details, account login/password associated with authenticating the device for communication on the trusted secure network, organization's asset tag number, accessories included with the device (e.g., charger, cables, type of cable connections (e.g., microUSB, USB2, etc.)), what tests have been performed on the device, and the like. The device information gathering module 504 and/or the device information records module 506 is configured to receive the information and appropriately format it for saving in (or associating with) the files/records for the given device 106. The device information records module 506 updates the files/records for the given device 106 at a block 420.

At a block 422, the first control unit 102 determines whether an alert or notification event for a given device 106 has occurred based on analysis of the device inventory. The device status/event module 512 is configured to determine if there is interesting or useful information about one or more of the inventoried devices that may be of interest to respective device(s). For example, providing a warning to a device 106 that its battery level is below a user configured threshold; alerting a device 106 that its operating system is out of date with the latest version; "poking" a device 106 to make it wake up, play sounds, or request its location information; or sending a message to a device 106 to tell the current user to return the device to its owner, custodian, or another user. The communication module 510 is configured to communicate the alert or notification to the appropriate device(s) 106 at a block 424.

At a block 426, the first control unit 102 receives scheduling requests to use certain of the devices 106 by the organization or group personnel. The scheduling module 514 is configured to process the scheduling requests and determine availability of devices in accordance with the scheduling requests and the device inventory. As an example, the scheduling module 514 may reserve certain of the devices 106 for use at a user determined time in accordance with a scheduling request. At a block 428, the communication module 510 is configured to communicate notifications associated with the scheduling request, such as confirming reservation of devices, notifying a current user of a device 106 that the device has been reserved by another user and will need to be given to the another user by a certain time, notifying certain of the devices 106 of an upcoming test, or notifying certain of the devices 106 to conduct a certain test and to record the test results.

These and other functionalities are possible once information from devices in a trusted network are automatically extracted and automatically updated as information associated with the devices change.

Figure 6:
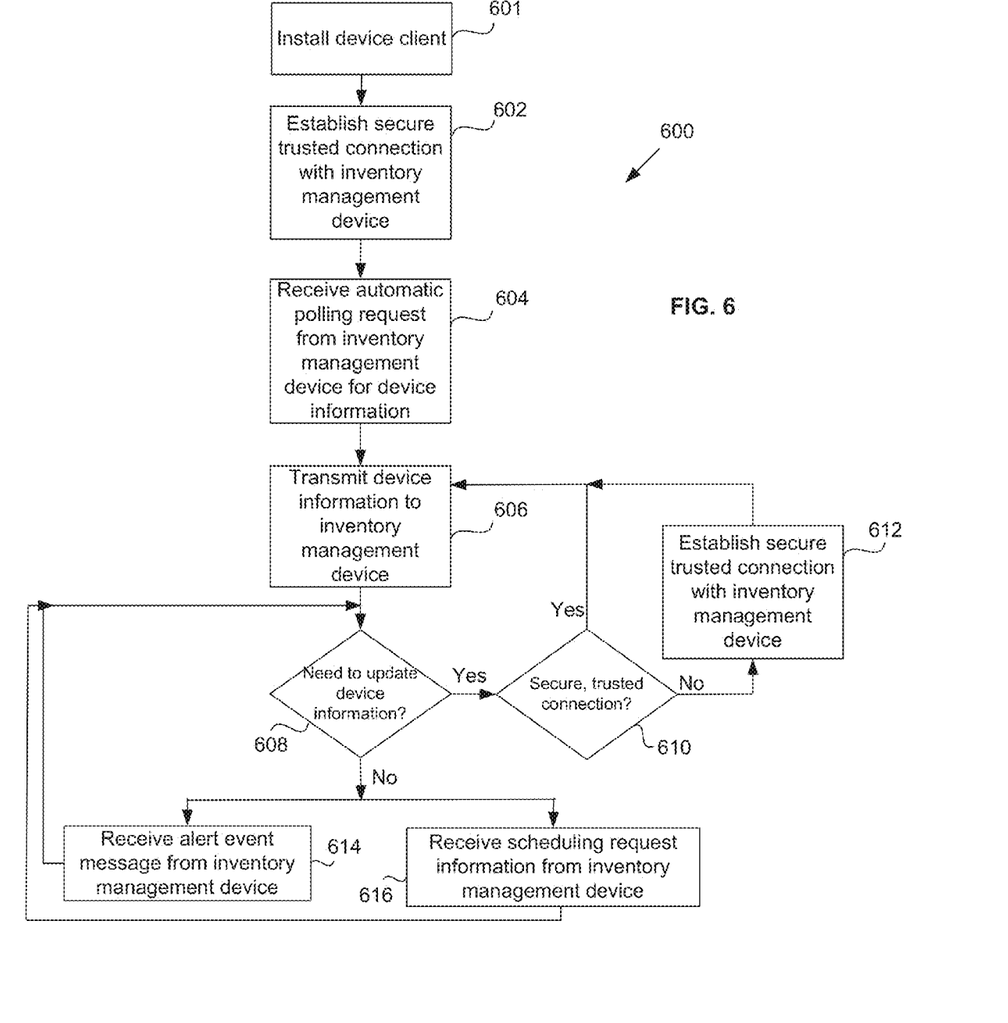
FIG. 6 illustrates an example flow diagram showing functionalities and operations associated with device inventory management implemented in a device of FIG. 1 and/or FIG. 2 according to some embodiments.

FIG. 6 illustrates an example flow diagram 600 showing functionalities and operations associated with device inventory management implemented in the device client 146 of each of a given device 106 or 108 and/or the device application 300 of each of a given device 212 according to some embodiments. FIG. 6 will be described with respect to device client 146, devices 106, and first control unit 102. However, similar to the description above for FIG. 4, it is understood that FIG. 6 can also apply to device client 146, devices 108, device application 300, devices 212, second control unit 104, and/or third control unit 202.

At a block 601, the device client 146 (which includes the client inventory management component) is installed on the given device 106. Once the device client 146 has been downloaded from the first control unit 102 or some other machine to the given device 106, a secure, trusted connection can be established between the given device 106 and the first control unit 102 (block 602). The establishment of the secure, trusted connection is similar to that discussed above with respect to block 402 of FIG. 4.

Next at a block 604, the device 106 receives an automatic polling request from the first control unit 102 to extract one or more device information associated with the device 106. In response, the device 106 provides its device information to the first control unit 102 at a block 606. The device information transmitted by the device 106 to the first control unit 102 corresponds to the device information received by the first control unit 102 at block 404 of FIG. 4.

In one embodiment, the device client 146 is configured to automatically monitor for device information updates and automatically provide such updates to the first control unit 102 (yes branch of block 608). In another embodiment, the device 106 receives an automatic polling request from the first control unit 102 to extract potential updated device information at the block 608. In still another embodiment, the device client 146 automatically monitors for updated device information and the first control unit 102 performs automatic polling for updated device information. In any case, if a secure, trusted connection exists (yes branch of block 610), then such updated device information is transmitted to the first control unit 102 (returns to block 606). If there is currently no secure, trusted connection (no branch of block 610), then a secure, trusted connection is established with the first control unit 102 at a block 612 before the updated device information is transmitted to the first control unit 102 (returns to block 606).

Once a master inventory of the devices in a trusted network with the first control unit 102 has been established (and appropriately maintained) (block 608 and no branch), the master inventory can be mined to alert users regarding certain device events or actions to take on the devices. For instance, at a block 614, for useful statistics (e.g., percentage of devices that upgraded to a new OS, how long it takes for devices to upgrade to a new OS once the upgrade becomes available, models or types of devices mostly tested, etc), to schedule use of devices, alert users regarding certain device events or actions to take on devices, and other functionalities are made possible by virtue of the master inventory.

For instance, at a block 414, the device 106 receives an alert event message from the first control unit 102. The first control unit 102 transmitted the alert event message at the block 424 in FIG. 4. The alert event message comprises one or more alert or notification concerning the device 106 based on analysis of its device information. For example, providing a warning to the device 106 that its battery level is below a user configured threshold; alerting the device 106 that its operating system is out of date with the latest version; "poking" the device 106 to make it wake up, play sounds, or request its location information; or sending a message to the device 106 to tell the current user to return the device to its owner, custodian, or another user.

At a block 616, the device 106 receives scheduling request information from the first control unit 102. The first control unit 102 transmitted the scheduling request information at the block 428 in FIG. 4. The scheduling request information comprises, for example, confirming reservation of devices, notifying a current user of the device 106 that the device has been reserved by another user and will need to be given to the another user by a certain time, notifying certain of the devices 106 of an upcoming test, or notifying certain of the devices 106 to conduct a certain test and to record the test results.

Figure 7:
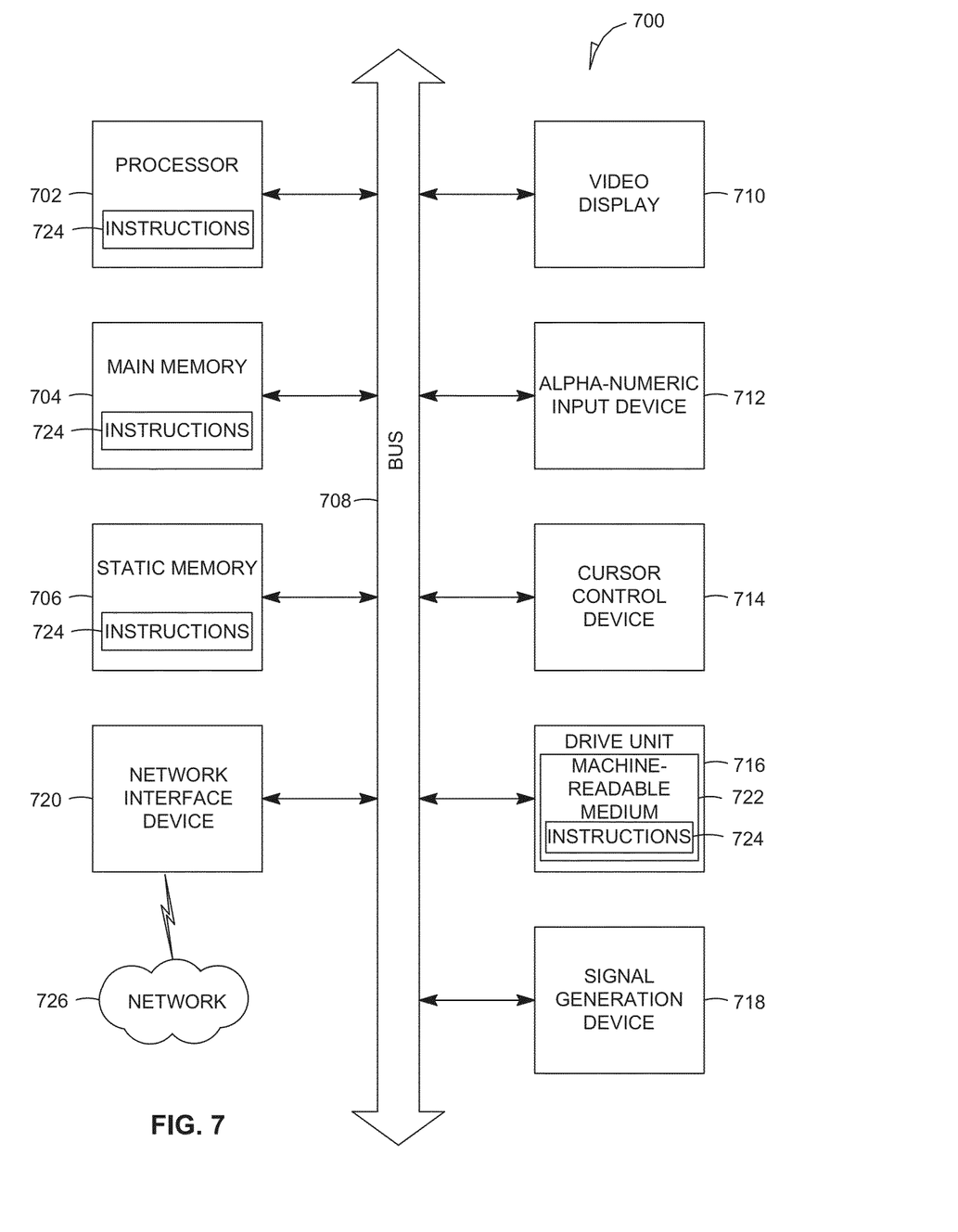
FIG. 7 shows a diagrammatic representation of a machine in the example form of a computer system within which a set of instructions, for causing the machine to perform any one or more of the methodologies of FIG. 4, 5, or 6 according to some embodiments.

FIG. 7 shows a diagrammatic representation of a machine in the example form of a computer system 700 within which a set of instructions, for causing the machine to perform any one or more of the methodologies discussed herein, may be executed. As an example, the computer system 700 may comprise any of the first control unit 102, second control unit 104, third control unit 202, devices 106, devices 108, and/or devices 212. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (CPU), or both), a main memory 704 and a static memory 706, which communicate with each other via a bus 708. The computer system 700 may further include a video display unit 710 (e.g., liquid crystal display (LCD), organic light emitting diode (OLED), touch screen, or a cathode ray tube (CRT)). The computer system 700 also includes an alphanumeric input device 712 (e.g., a physical or virtual keyboard), a cursor control device 714 (e.g., a mouse, a touch screen, a touchpad, a trackball, a trackpad), a disk drive unit 716, a signal generation device 718 (e.g., a speaker) and a network interface device 720.

The disk drive unit 716 includes a machine-readable medium 722 on which is stored one or more sets of instructions 724 (e.g., software) embodying any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor, or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system or one or more components of a computer system (e.g., a processor or a group of processors) may be configured by software (e.g., an application or application portion) or firmware (note that software and fir can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
establishing a secure, trusted connection between an inventory management device and each device of a plurality of devices over a first network, a first device included in the plurality of devices being a different type of device from a second device included in the plurality of devices;
automatically extracting, by the inventory management device, device information from each device of the plurality of devices over the first network, the device information comprising an operating system (OS) version and a battery charge level indication associated with each device of the plurality of devices;
obtaining supplemental device information based on at least a portion of the device information extracted from the plurality of devices, the supplemental device information obtained by the inventory management device accessing a source other than the plurality of devices, the source being at least one of a server and a device information repository, the supplemental device information not being available from the plurality of devices;
storing the supplemental device information with the device information;
creating, by the inventory management device, an inventory of at least one of files and records pertaining to the plurality of devices based on the extracted device information and the supplemental device information in a database over a second network;
automatically maintaining the inventory by the inventory management device, wherein the automatically maintaining of the inventory includes automatically extracting at least updated device information associated with an update event of the first device; and
receiving instructions at the inventory management device issued from a remote device over the second network that causes the inventory management device to provide content to the plurality of devices over the first network using the database as a linking mechanism that provides the device information and secure connection information, both unknown by the remote device, to the inventory management device.

2. The method of claim 1, comprising registering each device of the plurality of devices with the inventory management device for a purpose other than to inventory the plurality of devices, wherein the registering of each device occurs prior to establishing the secure, trusted connection.

3. The method of claim 1, further comprising receiving at least one of a searching, sorting, reporting, or data mining request, and using the inventory to fulfill the request.

4. The method of claim 1, further comprising receiving freeform-type device information, and including the freeform-type device information in the inventory.

5. The method of claim 1, further comprising determining occurrence of an alert event associated with the first device based on the inventory, and communicating a notification to the first device of the alert event.

6. The method of claim 1, further comprising receiving a scheduling request to use one or more devices of the plurality of devices, and communicating a notification of device availability in accordance with the received scheduling request and the inventory.

7. The method of claim 1, wherein the device information comprises one or more of a device name, a device Internet Protocol (IP) address, a device model number, a device serial number, a device identifier, a software version, an application version, a firmware version, a kernel version, a build number, browser details, screen details, hardware acceleration availability, sound mode, battery status, phone number, network type, carrier, service state, mobile network state, signal strength, international mobile equipment identity (IMEI), IMEI software version, Wi-Fi settings, Wi-Fi media access control address (MAC) address, Bluetooth address, up time, geo-location information, storage capacity, current storage availability, account information, email address, information associated with details of device hardware features, information associated with device camera resolution, information associated with existence of a device camera, information associated with existence of a device accelerometer, information associated with existence of a global positioning system (GPS) chip, information associated with a device state, information associated with a device setting, information associated with a device configuration, information associated with a device implementation, information associated with a device identifier, or information associated with device accounts.

8. A system comprising:
a processor of an inventory management device configured to:
automatically extract device information from each device of a plurality of devices, the device information comprising an operating system (OS) version and a battery charge level indication associated with each device of the plurality of devices, wherein a secure, trusted connection has been established with each device over the first network and a first device included in the plurality of devices is a different type of device from a second device included in the plurality of devices; and
obtain supplemental device information based on at least a portion of the device information extracted from the plurality of devices, the supplemental device information obtained by the processor accessing a source other than the plurality of devices, the source being at least one of a server and a device information repository, the supplemental device information not being available from the plurality of devices; and
a storage device of a database configured to communicate in with the processor over a second network to store an inventory of at least one of files and records pertaining to the plurality of devices in the database, the at least one of files and records based on the device information and the supplemental device information, wherein the processor is configured to automatically maintain the inventory including automatically extracting at least updated device information associated with an update event of the first device;

the processor further configured to receive instructions issued from a remote device over the second network that causes the inventory management device to provide content to the plurality of devices over the first network using the database as a linking mechanism that provides the device information and secure connection information, both unknown by the remote device, to the inventory management device.

9. The system of claim 8, wherein the device information comprises metadata from each device of the plurality of devices.

10. The system of claim 8, wherein the secure, trusted connection comprises a wireless secure, trusted connection and each device of the plurality of devices comprises a mobile device.

11. The system of claim 8, wherein the processor is included in a server.

12. The system of claim 8, wherein the first device differs from the second device in at least one of hardware, firmware, software, operating system, operating system version, platform, web browser, or content viewing applications.

13. The system of claim 8, wherein the processor receives at least one of a searching, sorting, reporting, or data mining request, and the processor uses the inventory to fulfill the request.

14. The system of claim 8, wherein the processor receives freeform-type device information, and wherein the storage device includes the freeform-type device information as part of the inventory.

15. The system of claim 14, wherein the freeform-type device information comprises one or more of a device purchase date, a device purchase price, service contract provider details, an account login and password associated with authenticating a device for the secure, trusted connection, an organization's asset tag number, accessories included with a device, or what tests have been performed on a device.

16. The system of claim 8, wherein the device information comprises one or more of a device name, a device Internet Protocol (IP) address, a device model number, a device serial number, a device identifier, a software version, an application version, a firmware version, a kernel version, a build number, browser details, screen details, hardware acceleration availability, sound mode, battery status, phone number, network type, carrier, service state, mobile network state, signal strength, international mobile equipment identity (IMEI), IMEI software version, Wi-Fi settings, Wi-Fi media access control address (MAC) address, Bluetooth address, up time, geo-location information, storage capacity, current storage availability, account information, email address, information associated with details of device hardware features, information associated with device camera resolution, information associated with existence of a device camera, information associated with existence of a device accelerometer, information associated with existence of a global positioning system (GPS) chip, information associated with a device state, information associated with a device setting, information associated with a device configuration, information associated with a device implementation, information associated with a device identifier, or information associated with device accounts.

17. One or more computer-storage media storing computer-usable instructions for performing a method comprising:

establishing a secure, trusted connection between a first inventory management device and each device of a plurality of devices over a first network, a first device included in the plurality of devices being a different type of device from a second device included in the plurality of devices;

automatically extracting, by the first inventory management device, device information from each device of the plurality of devices over the secure, trusted connection, the device information comprising an operating system (OS) version and a battery charge level indication associated with each device of the plurality of devices;

creating, by the first inventory management device, an inventory of at least one of files and records pertaining to the plurality of devices based on the extracted device information in a database over a second network; and receiving instructions at the first inventory management device issued from a second inventory management device over the second network that causes the first inventory management device to provide content from the second inventory management device to the plurality of devices over the secure, trusted connection, or a subsequent secure, trusted connection with the plurality of devices over the first network, using the database as a linking mechanism that provides the device information, and secure connection information that authenticates the secure, trusted connection or the subsequent secure, trusted connection, both unknown by the second inventory management device, to the first inventory management device.

18. The one or more computer-storage media of claim 17, wherein the database is geographically distributed from both the first inventory management device and the second inventory management device.

19. The one or more computer-storage media of claim 17, wherein the first network is a private network and the second network is a public network.

20. The one or more computer-storage media of claim 17, wherein the secure connection information comprises security tokens used to communicate with the plurality of devices.

* * * * *